(12) United States Patent
Tanabe et al.

(10) Patent No.: US 9,701,259 B2
(45) Date of Patent: Jul. 11, 2017

(54) HINGE ARM FITTING FEATURE

(71) Applicant: Toyota Motor Engineering & Manufacturing North America, Inc., Erlanger, KY (US)

(72) Inventors: Junji Tanabe, Commerce, MI (US); Que-Whang Rhee, Ann Arbor, MI (US); David Mulawka, Whitmore Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 16 days.

(21) Appl. No.: 14/146,199

(22) Filed: Jan. 2, 2014

(65) Prior Publication Data

US 2015/0183382 A1 Jul. 2, 2015

(51) Int. Cl.
*B60R 13/02* (2006.01)
*B62D 33/027* (2006.01)
*E05D 3/02* (2006.01)
*E05D 5/02* (2006.01)
*E05D 11/00* (2006.01)

(52) U.S. Cl.
CPC .......... *B60R 13/02* (2013.01); *B62D 33/0273* (2013.01); *B62D 33/0276* (2013.01); *E05D 3/02* (2013.01); *E05D 5/02* (2013.01); *E05D 11/0054* (2013.01)

(58) Field of Classification Search
CPC .. B62D 33/0273; B62D 33/0276; E05D 3/02; E05D 11/0054; E05D 5/02; B60R 13/02

USPC .................. 296/187.05, 192, 193.11, 56, 76; 180/69.21

See application file for complete search history.

(56) References Cited

U.S. PATENT DOCUMENTS

| | | | |
|---|---|---|---|
| 2,460,171 A | 1/1949 | Gessler | |
| 2,688,764 A | 9/1954 | Squire | |
| 4,366,598 A * | 1/1983 | Harasaki | B62D 25/12 16/382 |
| D282,925 S | 3/1986 | Carden, III | |
| 4,982,993 A | 1/1991 | Okazaki et al. | |
| 5,243,738 A * | 9/1993 | Kiefer | E05F 1/1207 16/298 |
| 7,618,084 B2 | 11/2009 | Kimura | |
| 7,651,148 B2 | 1/2010 | Hustyi et al. | |
| 7,673,928 B2 | 3/2010 | Walker et al. | |
| 7,774,900 B2 * | 8/2010 | Shaw | 16/343 |
| D627,690 S | 11/2010 | Madden | |
| 7,987,554 B2 * | 8/2011 | Hakamata | E05D 5/062 16/250 |
| 2010/0088850 A1 * | 4/2010 | Dringenberg | 16/251 |
| 2013/0076073 A1 | 3/2013 | Tanaka et al. | |

* cited by examiner

*Primary Examiner* — Glenn Dayoan
*Assistant Examiner* — Dana Ivey
(74) *Attorney, Agent, or Firm* — Dinsmore & Shohl LLP

(57) ABSTRACT

The present invention is a garnish that is specially designed to cover the hinge arm connecting a vehicle truck lid to the vehicle. The cover includes an inside surface, a first end and a second end. The cover further includes a rib and a flange portion. The rib is located along the inside surface of the cover at the first end. Opposite the rib, the flange portion extends generally orthogonally from the first end of the cover. The rib and flange portion help to secure the garnish and increase its effectiveness at covering other components of the vehicle.

7 Claims, 3 Drawing Sheets

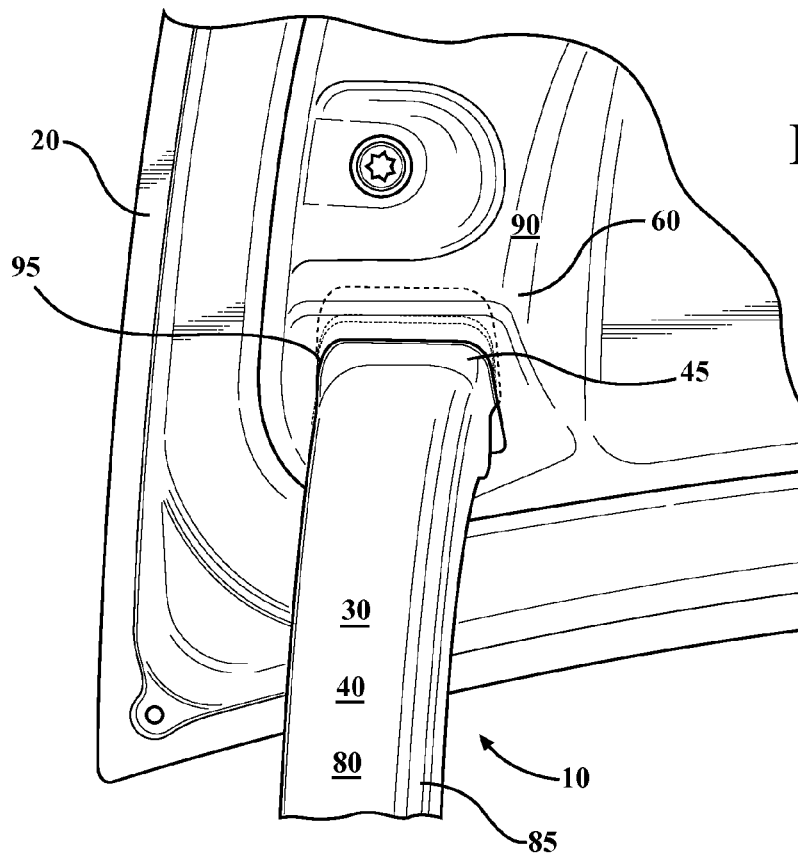
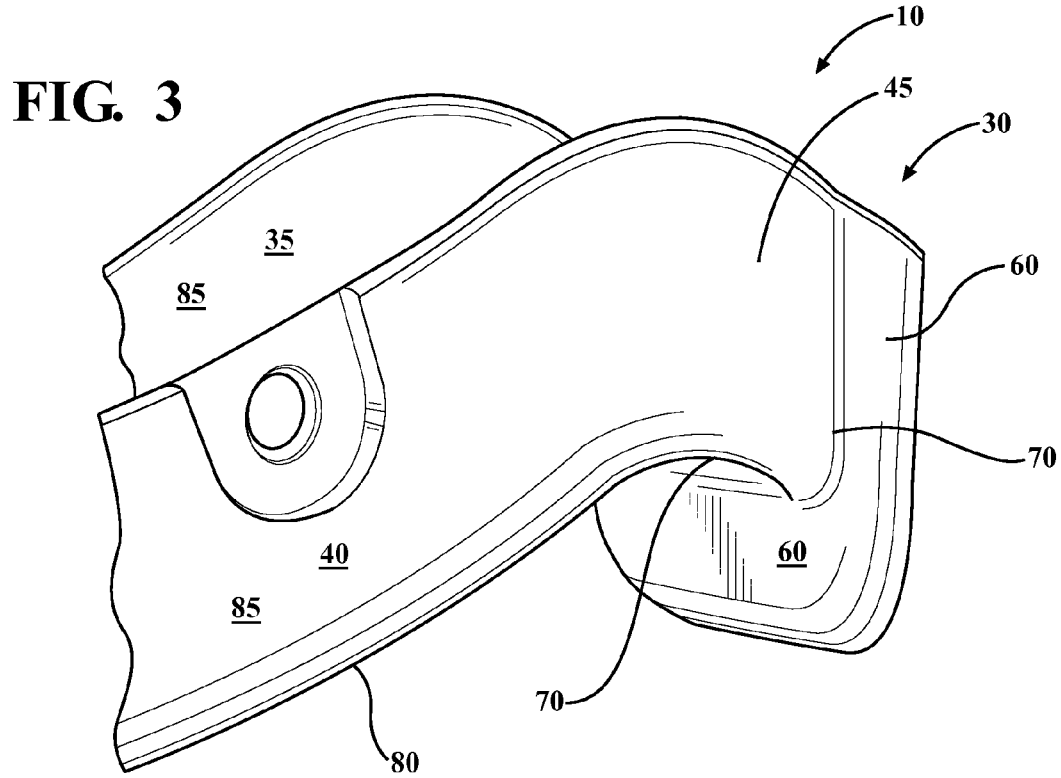

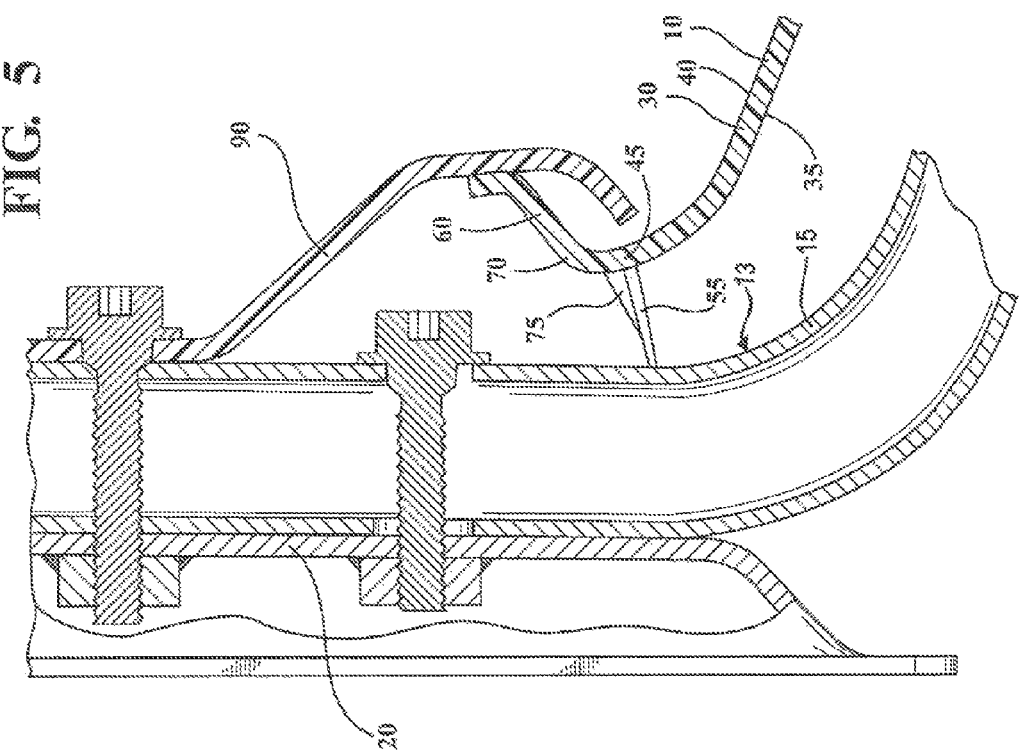
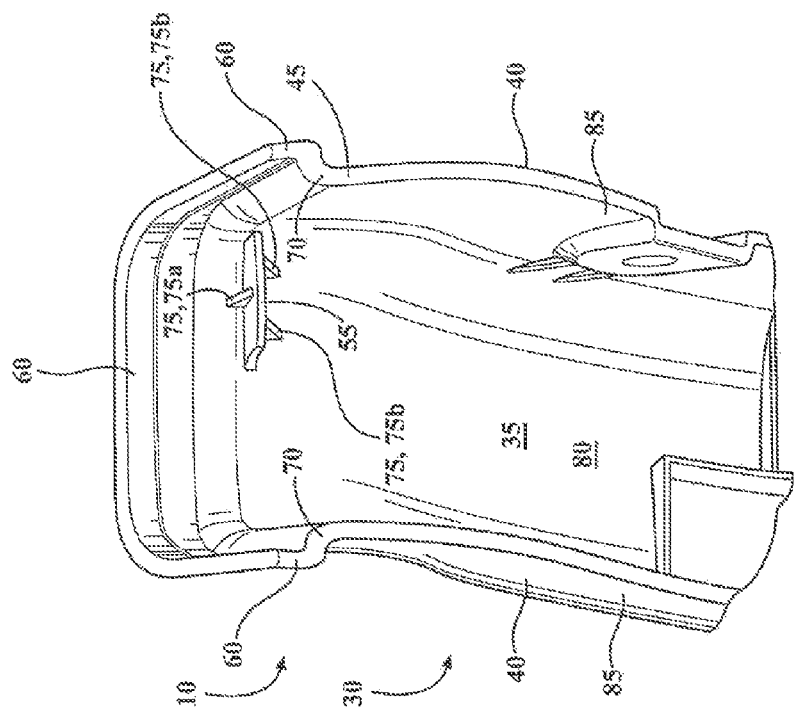

HINGE ARM FITTING FEATURE

FIELD OF THE INVENTION

The present invention relates to vehicle garnishes. Specially, to a garnish designed to cover a hinge arm attached to a deck lid covering a vehicle's trunk.

BACKGROUND OF THE INVENTION

Garnishes have been used to cover various parts and components of vehicles for quite some time. Garnishes help to separate the user or occupant of the vehicle from mechanical, electrical, and structural components of the vehicle. Garnishes provide a physical barrier that protects the vehicle and the passengers, while at the same time providing an appearance that is more refined and luxurious.

SUMMARY OF THE INVENTION

The present invention is a garnish that is specially designed to cover a hinge arm connecting a vehicle truck lid to the vehicle. The garnish includes a cover that has an inside surface, an outside surface, a first end and a second end. The garnish further includes a rib and a flange portion. The rib is located along the inside surface of the cover at the first end. Opposite the rib, the flange portion extends generally orthogonally from the first end of the cover. The rib and flange portion help to provide structural support between the hinge arm, hinge garnish, and trunk lid garnish which achieves an improved fitting appearance between all parts.

When the garnish is installed onto the hinge arm connecting the vehicle to the trunk lid, the garnish is secured by being sandwiched, at least in part, between the hinge arm and a trunk lid garnish covering a portion of the trunk lid. The rib projects from the cover to contact the hinge arm, thus utilizing the rigid hinge arm as a structural datum, and the flange portion extends to contact the trunk lid garnish which serves as a rigid planar support for the flexible trunk lid garnish, thereby helping to maintain a good fitting appearance between the hinge garnish and the trunk lid garnish.

Other features and advantages of the present invention will become apparent from the following detailed description with reference to the accompanying drawings.

BRIEF DESCRIPTION OF THE DRAWINGS

To complement this description and in order to aid in a better understanding of the invention's characteristics, a set of illustrative and non-limiting drawings is included as follows:

FIG. 2 shows a perspective view of a portion of the hinge arm garnish nearest the trunk lid;

FIG. 3 shows a perspective view of a first end of the garnish;

FIG. 4 shows a perspective view of the inside surface of the first end of the garnish; and FIG. 5 shows a cross sectional view of the first end of the garnish installed onto the hinge arm.

DETAILED DESCRIPTION OF THE PREFERRED EMBODIMENTS

Figure 1:
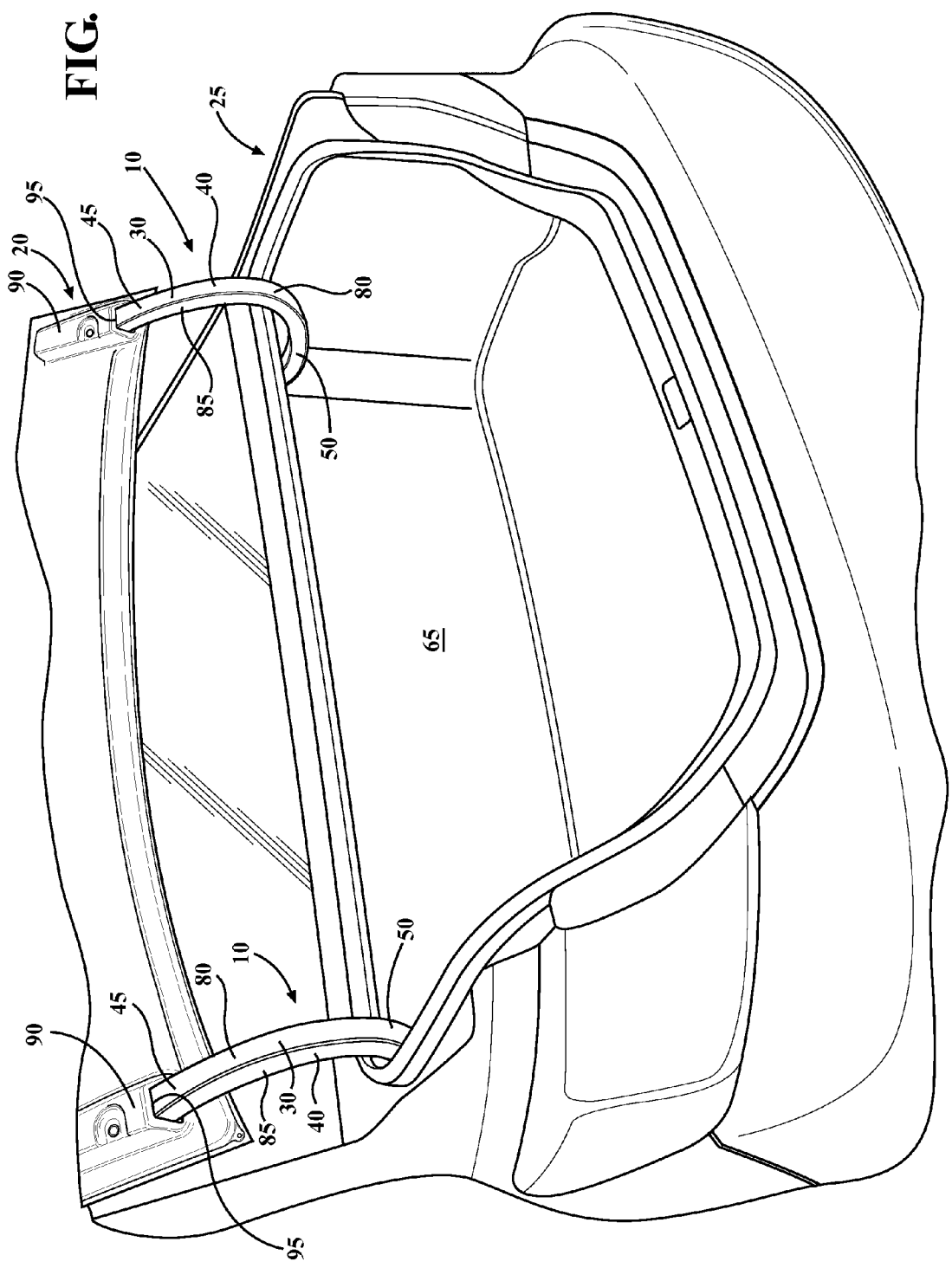
FIG. 1 shows a perspective view of a rear end of a vehicle having an open trunk lid with hinge arms covered by hinge arm garnishes.

With reference now to FIG. 1, a garnish 10 of the present invention designed for a hinge arm 15 (not shown in FIG. 1 because it is disposed under the garnish 10) connecting a trunk lid 20 to a vehicle 25 is shown. The garnish 10 includes a cover 30 with an inside surface 35, an outside surface 40, a first end 45 and a second end 50. The garnish 10 also includes a rib 55, and a flange portion 60, shown in FIGS. 3 and 4.

The cover 30 has a curved profile from the first end 45 to the second end 50. The curved profile is designed to mirror that of the hinge arm 15 to be covered by the garnish 10. The first end 45 of the cover 30 is designed to be located at an end of the hinge arm 15 that attaches to the trunk lid 20, and the second end 50 is designed to be located at an end of the hinge arm 15 closer to the interior of the trunk 65 of the vehicle 25.

With reference now to FIG. 4, the rib 55 is disposed on the inside surface 35 of the first end 45 of the cover 30. The rib 55 is rectangular in shape, and includes rounded corners. The rib 55 is designed so as to contact an external surface 13 of the hinge arm 15 when the garnish 10 is installed onto the vehicle 25.

As shown in FIG. 3, the flange portion 60 extends generally orthogonally from the first end 45 of the cover 30. The flange portion 60 extends from the outside surface 40 of the cover 30. In the preferred embodiment, the outside surface 40 of the cover 30 faces three directions and the flange portion 60 extends away from the cover 30 so as to include all three directions. A transition area 70 between the cover 30 and the flange portion 60 includes a curvature or radius on the inside surface 35 and the outside surface 40 of the cover 30. The curved transition area 70 produces a more aesthetically pleasing part, and aids in installation by reducing the number of sharp corners. The orthogonally extending flange portion 60 covers the attachment of the hinge arm 15 to the trunk lid 20 and provides a contact surface to aid in securing the garnish 10, as discussed below.

Again with reference to FIG. 4, the rib 55 extends generally orthogonally from the inside surface 35 of the cover 30. The generally orthogonal orientation of the rib 55 can be compared to a line that is tangent to the cover 30 where the rib 55 is located. Because the cover 30 mirrors the hinge arm 15, the rib 55 should be generally orthogonal to the hinge arm 15 when the garnish 10 is installed, thereby applying pressure to the rib 55 in a direction that is parallel to the orientation of the rib 55.

The rib 55 is reinforced with one or more support structures 75. The support structure(s) 75 span from the rib 55 to the inside surface 35 of the cover 30. The support structure (s) 75 are generally triangular in shape and extend generally perpendicular from the cover 30 and generally perpendicular from the rib 55. The preferred embodiment includes three support structures 75. One support structure 75a is located on one side of the rib 55 near the middle, and the other two support structures 75b are located on the opposite side of the rib 55 and spaced apart from the middle.

With reference now to FIGS. 1-4, the cover 30 includes a center portion 80 and two side portions 85. The side portions 85 extend generally perpendicular from center portion 80. The center portion 80 and the side portions 85 form a general U-shape with a flat bottom when viewed in cross section. Similar to the cover 30 discussed above, the generally U-shape formed by the center portion 80 and the side portions 85 follows a profile running from the first end 45 to the second end 50 of the cover 30 that is similar to the profile of the hinge arm 15.

In one embodiment, the rib 55 extends from the center portion 80 and is disposed between the two side portions 85. The rib 55 is orthogonal to the center portion 80 and perpendicular to the side portions 85. A space exists between the rib 55 and the side portions 85.

The garnish 10 is installed over the hinge arm 15. The garnish 10 extends along the length of the hinge arm 15 at least as far as would be visible to a user opening or closing the trunk 20. The flange portion 60 of the garnish 10 is disposed near the trunk lid 20. A trunk lid garnish 90 covers the inside surface of the trunk lid 20, and includes an opening 95 for the hinge arm 15 and hinge arm garnish 10. The trunk lid garnish 90 is attached to the trunk lid 20 and helps to secure the hinge arm garnish 10. As shown in FIG. 5 the garnish 10 is sandwiched by the trunk lid garnish 90 contacting the flange portion 60 on one side of the garnish 10, and by the hinge arm 15 contacting the rib 55 on the other side of the garnish 10. The opposing force generated by these two contact points secures, at least in part, the garnish 10 relative to the hinge arm 15 and trunk lid garnish 90.

When installed, the garnish 10 covers the hinge arm 15 and the attachment of the hinge arm 15 to the trunk lid 20. The U-shape cross section covers three sides of the hinge arm 15, essentially hiding the hinge arm 15 from view of a user opening or closing the trunk. The flange portion 60 extends to cover the attachment of the hinge arm 15 to the trunk lid 20 by extending underneath the trunk lid garnish 90 thereby hiding from view any components that would be visible though the opening 95 in the trunk lid garnish 90 designed to receive the hinge arm 15 and hinge arm garnish 10.

The garnish 10 can be integrally molded from plastic as a single unit using injection molding. Based on the above teachings, other materials and manufacturing methods known to those skilled in the art can be used to produce the garnish 10.

Obviously, many modifications and variations of the present invention are possible in light of the above teachings and may be practiced otherwise then as specifically described while within the scope of the appended claims.

The invention claimed is:

1. A hinge arm assembly for a trunk lid of a vehicle comprising:
    a hinge arm connecting the trunk lid to the vehicle, the hinge arm having an external surface;
    a cover disposed around the hinge arm, the cover having an inside surface, an outside surface, a first end and a second end;
    a rib disposed on the inside surface of the cover at the first end, the rib directly abutting the external surface of the hinge arm when the cover is in an installed position; and
    the cover having an flange portion extending generally orthogonally from the first end, the flange portion abutting a garnish of the trunk lid.

2. The hinge arm assembly of claim 1, wherein the rib is orthogonal to the inside surface of the cover.

3. The hinge arm assembly of claim 2, wherein the rib is supported by one or more support structures.

4. The hinge arm assembly of claim 3, wherein the one or more support structures are generally perpendicular to the rib.

5. The hinge arm assembly of claim 1, wherein the cover includes a center portion and two side portions, the side portions extending generally perpendicularly from the center portion.

6. The hinge arm assembly of claim 5, wherein the rib extends from the center portion and is disposed between the two side portions.

7. The hinge arm assembly of claim 6, wherein the rib is generally perpendicular to the two side portions.

* * * * *